Figure 1:
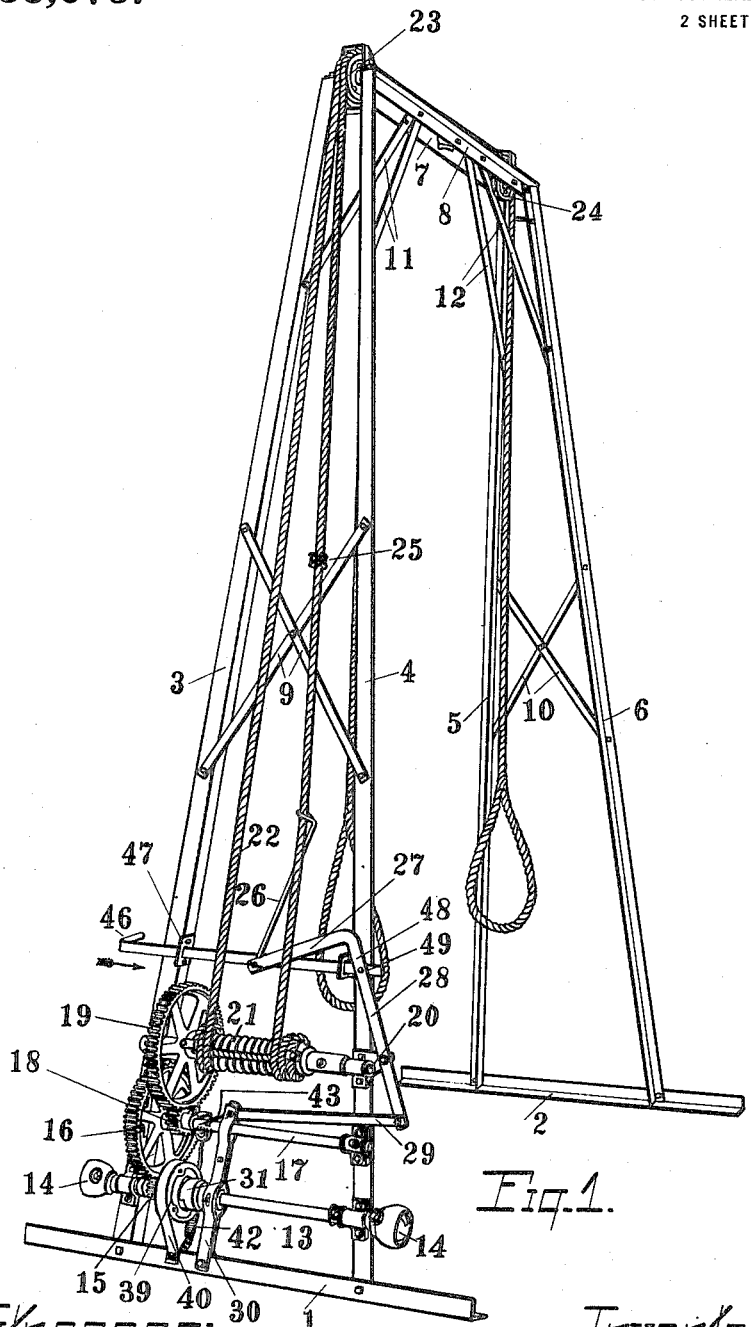

A. T. ADAMS.
MACHINE BRAKE.
APPLICATION FILED MAY 9, 1912.

1,238,075.

Patented Aug. 28, 1917.
2 SHEETS—SHEET 1.

Witnesses:
Alfred P. Keketu
Herman J. Schroeder

Inventor:
Alonzo T. Adams
by W. C. Indiustin
his Attorney.

A. T. ADAMS.
MACHINE BRAKE.
APPLICATION FILED MAY 9, 1912.
1,238,075.
Patented Aug. 28, 1917.
2 SHEETS—SHEET 2.
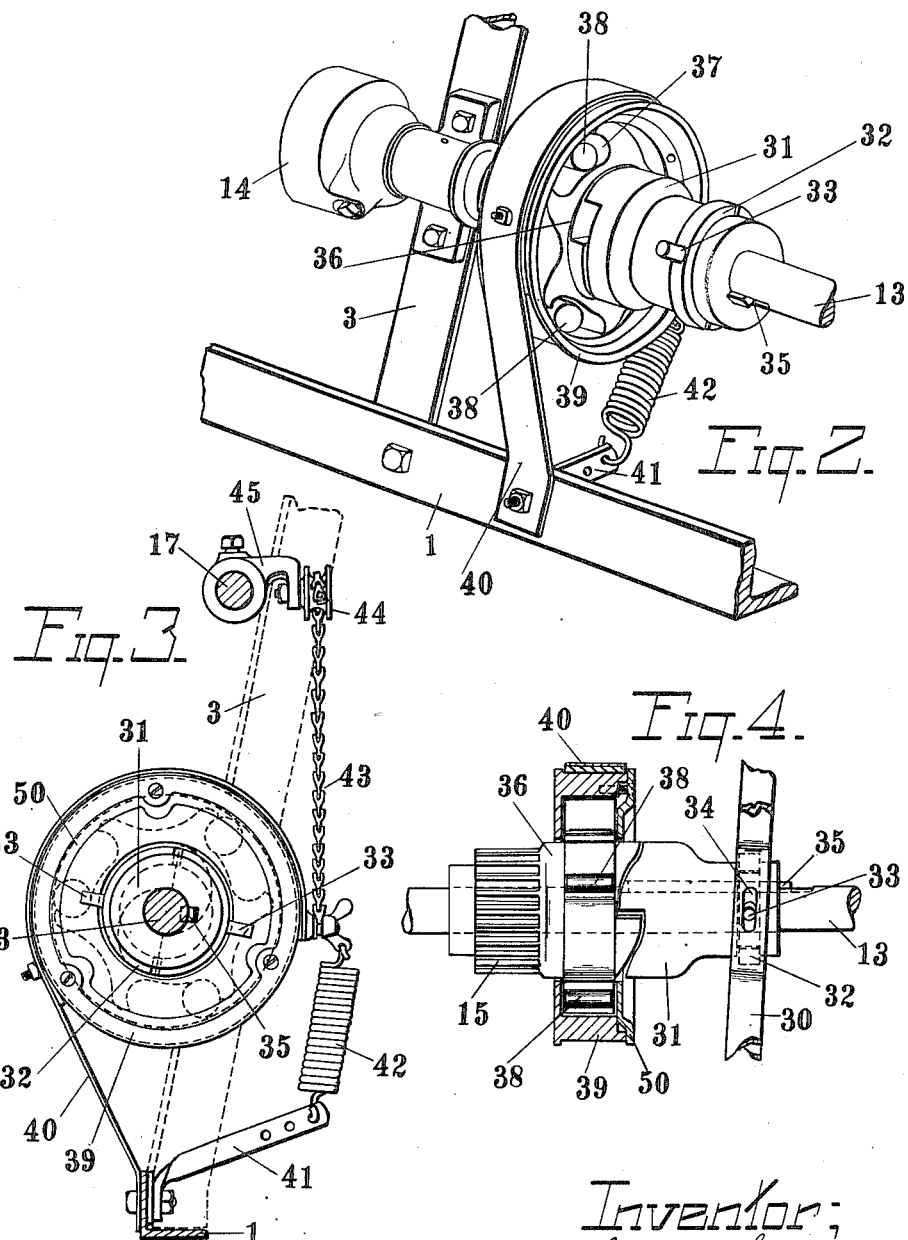
Witnesses;
Alfred P. Hekler
Herman J. Schroeder
Inventor;
Alonzo T. Adams
by W.C. Jmdinston
his Attorney.

UNITED STATES PATENT OFFICE.

ALONZO T. ADAMS, OF MOLINE, ILLINOIS, ASSIGNOR TO MARSEILLES COMPANY, OF EAST MOLINE, ILLINOIS, A CORPORATION OF ILLINOIS.

MACHINE-BRAKE.

1,238,075. Specification of Letters Patent. Patented Aug. 28, 1917.

Application filed May 9, 1912. Serial No. 696,070.

*To all whom it may concern:*

Be it known that I, ALONZO T. ADAMS, a citizen of the United States, residing at Moline, in the county of Rock Island and State of Illinois, have invented certain new and useful Improvements in Machine-Brakes, of which the following is a specification, reference being had therein to the accompanying drawing.

My invention relates to improvements in hoisting apparatus, and more particularly to mechanisms employed to control the operation thereof, and my object is to simplify the construction and operation of the hoist and at the same time to so arrange the interrelation of the parts as to render the machine quickly responsive in hoisting or lowering.

Referring to the accompanying drawings in which similar numerals indicate identical parts—

Figure 1 is a perspective view of a hoisting mechanism embodying my improvements. Figs. 2, 3 and 4 are details which are more fully described hereinafter.

I preferably construct the frame of the apparatus of metallic beams, which comprise base pieces 1, 2, to each of which are bolted a pair of uprights 3, 4, and 5, 6 converging at the top and rigidly attached to parallel beams 7 and 8 which they support. Suitable braces 9 and 10 connect the uprights 3, 4 and 5, 6, intermediate their length, and similar braces 11 and 12 connect the uprights with the beams 7 and 8, presenting a rigidity of structure fully competent to withstand the strains to which it may be subjected.

Supported on one pair of the uprights, in this instance 3 and 4, is the operating mechanism which I will now describe. Journaled in suitable bearings on the uprights 3 and 4 is a shaft 13, provided with a coupling 14 at either end, to connect with any source of power. A pinion 15 on the shaft 13, transmits the motive power to a spur gear 16 meshing therewith and revolving on a fixed shaft 17, which is supported in bearings on the uprights 3 and 4. Secured to the spur-gear 16, and revolving therewith, is a pinion 18 which engages with a spur-gear 19, the latter being secured to a shaft 20, journaled in suitable bearings on the uprights 3 and 4. A winding drum 21 is mounted on the shaft 20 and revolves therewith.

A cable 22 is adapted to be wound upon the drum 21, and is attached thereto in such a manner that both ends of the cable can be utilized for attachment to the object to be hoisted. The cable 22 leads up and over a double grooved sheave 23 mounted on the parallel beams 7 and 8, one end of the cable then swings downwardly, the other end passing over a single grooved sheave 24, also mounted on the parallel beams 7 and 8, and swinging downwardly to the same length as the former end, both ends being adapted to be attached to the body to be raised by means of the loops shown, or by hooks or grapples of a suitable nature.

I control the hoisting or lowering by a modified form of claw-clutch mounted on shaft 13, and which is operated either by hand or automatically as I will now explain; secured on the cable 22 is a collar or stop 25, which, as the cable is wound on the drum 21, contacts with a rod 26, through a loop on the end of which the cable moves; the lower end of the rod 26 is pivotally connected to an arm 27 of a lever bent in the form of a bell crank and pivoted at the lower portion of its secured arm 28, on the upright 4, or preferably as shown on a bracket forming part of a bearing in which the shaft 20 is journaled. A link 29 connects the lower end of the arm 28 with a rocking lever 30 pivoted on the base 1.

The rocking lever 30 is formed preferably of two vertically disposed pieces adapted to embrace and engage with a sliding member 31 of a claw-clutch on the shaft 13, by means of a collar 32 on the member 31, pins 33 on said collar engaging with slots 34 in the rocking lever 30; while the member 31 revolves with the shaft 13, being connected thereto by a spline 35, it is longitudinally movable on shaft 13 by operation of the rocking lever 30. The claws of the clutch member 31 are adapted to engage with similar claws on the second clutch member 36, the latter being preferably integral with the pinion 15 and loosely mounted on the shaft 13. A radial extension of the clutch member 36 has in its periphery, recesses 37, eccentric to the axis of the shaft 13, in which rollers 38 are employed, the latter as will be later explained, adapted to operate when desired, against the inner surface of a hollow wheel 39, loose upon the clutch member 36, and which covers the radial extension thereof.

Secured to the base 1 and leading over the wheel 39, is a brake-band 40; bolted to the base 1, and extending substantially at right angles thereto, is an arm 41, to the end of which is connected a coiled spring 42, having its upper end connected to the end of the brake-band 40, and exerting its force to hold the brake-band in normal engagement with the wheel 39. A short chain or cable 43, is also attached to the end of the band 40 and extends over a pulley 44 to the rocking-lever 30 to which it is secured; the pulley 44 is mounted on a bracket 45 on the fixed shaft 17. A sliding bar 46 is supported in guides 47 and 48 on the uprights 3 and 4, and is pivotally connected to the bent lever 28 at 49. A plate 50 is secured to the open side of the wheel 39 to retain the rollers 38, and to exclude dust.

In operating the apparatus, the cable 22 is secured to the object to be hoisted, the bar 46 is moved in the direction of the arrow and rocking the bent lever 28, the latter, through the link 29, rocks the lever 30, moving the two members 31 and 36 of the claw-clutch into engagement, and as the shaft 13 is supposed to be constantly revolving, motion is transmitted to the drum 21 through the intermeshed gears and the pinion 15. During the hoisting operation, the wheel 39 is held firmly against movement by pressure of the brake-band 40, the rollers 38 being out of contact with the inner surface of the wheel 39 and inactive in the larger ends of the recesses 37.

As the cable 22 is wound upon the drum 21, the stop 25 contacts with the rod 26, forcing the latter down and swinging the bent lever 28, and through the link 29, rocking the lever 30 to disengage the members 31 and 36 of the claw-clutch, terminating the hoisting movement of the apparatus. When the claw-clutch is separated, the weight of the object being hoisted, acting upon the drum 21 to reverse it, the intermeshed gears and the pinion 15 are also moved reversely, and as the radial extensions of the claw-clutch member 36 are preferably integral with the pinion 15 it reverses with the latter causing the rollers 38 in the eccentric recesses 37 to be forced in contact with the inner surface of the wheel 39, the latter, however, is held from rotation by the tension of the spring 42, and the load remains suspended until it is desired to lower it at the will of the operator. The operator, by moving the bar 46 in a direction opposite to that indicated by the arrow, actuates the bent lever 28 farther than by the operation of the stop 25, consequently the rocking lever 30 is moved still farther in the direction of the bent lever 28, and through the chain 43 lifts the brake-band 40 from contact with the wheel 39 which is now free to revolve to lower the object previously hoisted; the lowering can be checked at any time, however, by moving the bar 46 a sufficient distance in the direction of the arrow so that the brake-band will engage with the wheel 39, holding it against further movement, and checking the revolution of the gears and drum 21 by reason of the engagement of the rollers 38 with the inner surface of the wheel 39, as will be readily understood.

It is evident that a further movement of the bar 46 will cause the members of the claw-clutch to engage, and as the shaft 13 is constantly revolving, the hoisting movement of the apparatus will be resumed. The collar or stop 25 is adjustable, so that the height to which the object being hoisted is to be raised can be regulated, when it is desired the machine is to be stopped automatically.

I do not limit myself to the frame as shown, nor to the employment of two ends of a cable for attachment to the object to be hoisted, for a frame of different structure may be employed, and a cable having only one end, to be attached to the object to be raised, may be utilized.

My improved mechanism is designed, and particularly well adapted, for the lifting and controlling of weighted bodies, such as a loaded wagon at the time when it is to be emptied by lifting its front end and permitting the contents to spill or flow out from the rear; such mechanisms being, generally considered, well known. The shaft 13 cannot only receive power at either end but can be coupled at either end, in the ordinary way in which such shafts are coupled, to the conveyer or take-away mechanism. This shaft is revolving continuously, and relative to the other driven parts, rotates rapidly. The power is taken from it relatively slowly when the weight is being lifted. But when the positive clutch is opened the friction check is applied, not to the drum, but to the small prime power pinion; it is quickly stopped, and any tendency to downward movement of the weight is delicately controlled.

The checking and controlling devices are compactly arranged on the rapidly rotating, continuously going power shaft, the combined friction and positive clutch element 36 being rigidly connected to the prime pinion, and immediately surrounded by the loose, hollow wheel or drum 39 at points where the action of its relatively small friction surfaces are brought to bear immediately upon the prime pinion, at the instant the weight becomes the power and acts to reverse the pinion.

What I claim is—

1. The combination of the supporting frame, the friction brake drum, the hub element, the shaft normally loose in the hub and rotating continuously in one direction, devices for automatically clutching the drum to the hub when the latter is rotating in one direction and for disengaging it when rotating in the opposite direction, the optionally controlled brake band interposed between the drum and the frame, and shaft clutch for connecting the shaft to the hub, the pinion adapted to be driven by the shaft in one direction, and to drive the brake drum in the opposite direction, and a train of devices constantly engaging with the pinion and adapted to rotate it rapidly in one direction, and to transmit power therefrom at slow speed when it moves in the opposite direction.

2. The combination of the supporting frame, the friction brake drum, the hub element, the shaft normally loose in the hub and continuously rotating in one direction, devices for automatically clutching the drum to the hub when the latter is rotating in one direction and for disengaging it when rotating in the opposite direction, the optionally controlled brake band interposed between the brake drum and the frame, the prime power pinion rigidly connected to the hub, the shaft clutch for connecting the shaft to the hub and the pinion, the reversible power transmitting devices connected to the pinion, and means actuated by the pinion to disengage the shaft clutch at predetermined times.

3. The combination of the supporting frame, the friction brake drum, the hub element, the shaft normally loose in the hub and rotating continuously in one direction, devices for automatically clutching the drum to the hub when the latter is rotating in one direction and for disengaging it when it rotates in the opposite direction, the brake band interposed between the brake drum and the frame, a shaft clutch for connecting the shaft to the hub, the power transmitting devices actuated by the hub, devices actuated automatically by the hub for disengaging the shaft clutch therefrom, manual devices for adjusting the brake band after the clutch has been disengaged.

In testimony whereof I affix my signature, in presence of two witnesses.

ALONZO T. ADAMS.

Witnesses:
H. J. SCHROEDER,
EDWARD CAHILL PEATTIE.